United States Patent
Banks et al.

(10) Patent No.: US 8,006,129 B2
(45) Date of Patent: Aug. 23, 2011

(54) DETECTING AND PREVENTING THE SPLIT-BRAIN CONDITION IN REDUNDANT PROCESSING UNITS

(75) Inventors: Donald E. Banks, San Jose, CA (US); Samer L. Theodossy, San Jose, CA (US); Frederick A. Frazer, Santa Clara, CA (US); Frederick G. Lewis, North Chelmsford, MA (US)

(73) Assignee: Cisco Technology, Inc., San Jose, CA (US)

( * ) Notice: Subject to any disclaimer, the term of this patent is extended or adjusted under 35 U.S.C. 154(b) by 315 days.

(21) Appl. No.: 12/245,157

(22) Filed: Oct. 3, 2008

(65) Prior Publication Data

US 2010/0088440 A1  Apr. 8, 2010

(51) Int. Cl.
*G06F 11/00* (2006.01)

(52) U.S. Cl. ............... 714/10; 714/11; 714/12; 714/47; 714/48

(58) Field of Classification Search .......... 714/47, 714/48, 10–12
See application file for complete search history.

(56) References Cited

U.S. PATENT DOCUMENTS

| | | |
|---|---|---|
| 5,950,230 A | 9/1999 | Islam et al. |
| 6,085,333 A | 7/2000 | DeKoning et al. |
| 6,148,410 A | 11/2000 | Baskey et al. |
| 6,418,116 B1 | 7/2002 | Egoshi |
| 6,604,177 B1 | 8/2003 | Kondo et al. |
| 6,622,265 B1 | 9/2003 | Gavin |
| 6,687,851 B1 | 2/2004 | Somers et al. |
| 6,728,896 B1 * | 4/2004 | Forbes et al. .......... 714/4 |
| 6,785,840 B1 | 8/2004 | Smith et al. |
| 6,845,467 B1 * | 1/2005 | Ditner et al. ........... 714/11 |
| 6,856,591 B1 | 2/2005 | Ma et al. |
| 6,865,591 B1 | 3/2005 | Garg et al. |
| 6,886,107 B2 | 4/2005 | Walsh et al. |
| 2001/0052067 A1 | 12/2001 | Klein |
| 2003/0056138 A1 | 3/2003 | Ren |
| 2004/0153695 A1 * | 8/2004 | Sidhu et al. ........... 714/4 |
| 2004/0153701 A1 * | 8/2004 | Pickell .................. 714/4 |
| 2005/0033778 A1 * | 2/2005 | Price ................... 707/202 |
| 2005/0097342 A1 * | 5/2005 | Gatto et al. ........... 713/189 |
| 2006/0236003 A1 * | 10/2006 | Lum et al. ............. 710/62 |
| 2008/0162984 A1 * | 7/2008 | Kalra et al. ........... 714/4 |
| 2009/0070639 A1 * | 3/2009 | Langford et al. ...... 714/57 |

OTHER PUBLICATIONS

Cisco Systems, Nonstop Forwarding with Stateful Switchover on the Cisco Catalyst 6500, White Paper, 16 pages, copyright 2005 Cisco Systems, Inc., San Jose, CA; downloaded from the Internet: <http://www.cisco.com/application/pdf/en/us/guest/products/ps708/c1244/cdccont_0900aecd801c5cd7.pdf>.

* cited by examiner

*Primary Examiner* — Scott Baderman
*Assistant Examiner* — Sarai Butler
(74) *Attorney, Agent, or Firm* — Charles E. Krueger

(57) ABSTRACT

In an example embodiment the occurrence of the split-brain condition in a High-Availability system, having active and standby processing units, is detected, its cause is diagnosed, and the cause is treated to prevent interruption of service. Diagnosis and treatment procedures are performed at the active processing unit prior to being performed at the standby processing unit.

30 Claims, 1 Drawing Sheet

DETECTING AND PREVENTING THE SPLIT-BRAIN CONDITION IN REDUNDANT PROCESSING UNITS

TECHNICAL FIELD

The disclosure relates generally to preventing the occurrence of a split-brain condition in a high availability system where a Standby processor attempts to take over the functions of an Active processor due to an apparent failure of the Active processor that has not actually occurred.

BACKGROUND OF THE INVENTION

In High Availability (HA) stateful, or non-stateful, systems which are configured with redundant peer processors, the "Active-Standby" or "Active-Active" models are used. In the "Active-Standby" model, one processor provides service (as the Active) while the second redundant processor, the Standby, waits to assume control should the Active fail (or be requested to switchover). In the "Active-Active" model, both processors, either located physically in the same system or in a physically separate system, provide service simultaneously (i.e., both are Active) while each acts as the Standby for Active work on the peer unit.

In the Active-Active model the "Default Active" unit is defined as the peer processor which acts as the Active unit for Active-Standby model applications, i.e., it preserves the Active-Standby model for that set of features and functions that continue to use the Active-Standby model in an Active-Active system. The "Default Standby" unit is defined as the unit that continues to play the Standby role for Active-Standby features and functions in an Active-Active system. Not all HA-enabled applications in an Active-Active system must implement the Active-Active model Peer processors in such systems must be connected via a communication channel (referred to as the "interconnect"). This interconnect can be "soft" or "hard"—i.e., it can be either a software communication channel or a hard wire that provides the communication channel. Since detection of a failure of the peer is critical, this interconnect is used as a channel to send regular "heartbeat"/"keepalive" signals in each direction so that failures can be quickly detected and a switchover to the remaining operational unit can be quickly effected.

In a stateful system, the interconnect is also used to send state data from an Active instance to a Standby instance. This keeps the Standby instance synchronized with the state of the Active instance so that the Standby instance can take over without service interruption should the Active instance fail.

When a failure of the peer is detected, a switchover is begun by the unit that detects the failure. After switchover, the unit that detected the failure assumes the Active role for all of the Active work previously being performed by the failed peer (this operation is called a "switchover").

OVERVIEW

Figure 1:
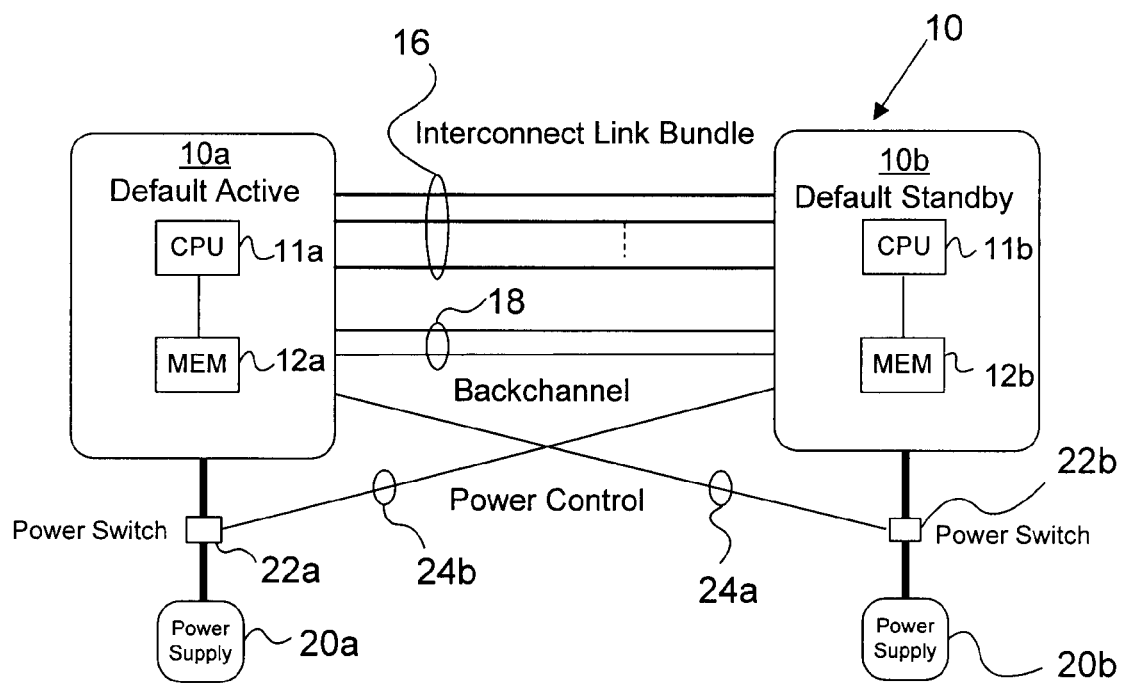
FIG. 1 is a block diagram of a system for implementing embodiments of the invention.

In one embodiment, loss of signaling between Active and Standby peer processing units in a high-availability system is detected, with the Active and Standby peer processing units connected by an interconnect over which interconnect keepalive signals are sent between Active and Standby peer processing units and over which interconnect acknowledge signals responsive to the interconnect keepalive signals are sent between the Active and Standby peer processing units at level and where the Standby processing unit takes over functions of the Active processing unit should the Active processing unit fail.

If loss of signaling is detected at either the Active or Standby processing units, the cause of the loss of signaling is diagnosed.

Diagnosing is always performed at the Active peer processing unit prior to being performed at the Standby peer processing unit.

Subsequent to diagnosing a cause of detected loss of signaling the other peer processing unit is treated to prevent loss of service. Treating is always performed by the Active peer processing unit prior to being performed by the Standby peer processing unit.

DETAILED DESCRIPTION OF THE EMBODIMENTS

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

A phenomenon commonly referred to as the "split-brain" condition can occur in redundant High Availability (HA) systems that use either an Active-Standby or Active-Active unit recovery model when communication is lost between the two peer execution units (separate systems in Box-to-Box configurations or multi-redundant processing units, e.g., Route Processors (RPs), in the single-system configuration).

Communication is lost either because the interconnect link that is used to communicate state and status between the two fails or because the peer unit otherwise fails to respond within the defined timeout interval. In such cases, if the failing unit is an "Active" unit (either the Active unit in an Active-Standby configuration or the failing unit in an Active-Active configuration), the unit providing the Standby protection (either the Standby unit in an Active-Standby configuration or the non-failing unit in an Active-Active configuration) decides that it must assume all Active service because its peer is no longer responding (the assumption is that the peer unit has failed). If, in fact, the reason that the unit is no longer responding is not that it has failed, but that the communication channel between the two units has failed or, alternatively, that the unit was temporarily too busy to respond, a false switchover is triggered and both units attempt to provide service for all configured protected services resulting in service disruption.

For these reasons timeout values must be carefully selected for each different platform and the application mix the platform is designed to support. Timeout values that are too short will cause a false switchover to be triggered when the other unit is "busy" for more than the timeout period. Timeouts that are too long will affect failure detection and switchover/recovery times.

When split-brain occurs in an Active-Standby configuration, the Active unit continues to provide service while the Standby unit, detecting the apparent failure of its peer, attempts to assume the Active role in order to take over service so that it can recover for what it perceives as a failing peer unit. In an Active-Active configuration, both units attempt to take over the Active work being done by their peer unit while maintaining the Active work that they are already providing. In either case, both units end up attempting to provide service for all of the protected resources configured in the system. Such an occurrence is almost always a disaster that severely disrupts service and the network thus defeating the purpose of the protection provided by a High-Availability configuration. Because of this, the condition must be detected and prevented both reliably and quickly.

While there is usually no way to absolutely guarantee that the split-brain condition cannot occur in a given configuration, there are ways to:
1. Significantly lower the probability that the condition can occur;
2. Ensure that should it occur, the probability that it can occur without being recognized is near zero; and
3. Ensure that when it does occur and is recognized, the condition can be successfully treated without harm and with minimum impact to the system and services being provided.

Implementing these steps requires additional hardware and software support. The additional hardware that is required includes:
1. Redundant links (two or more) between the redundant units;
2. An additional "backchannel" connection between the redundant units (the backchannel connections may also be redundant); and
3. A power cycler, and a control link connecting it, one for each unit, which allows each unit to power the other unit off and on (i.e., control the peer unit's power).

FIG. 1 depicts an example embodiment of a dual-processing unit 10 configured to prevent the occurrence of the split-brain. It shows Default Active and Default Standby units 10a and 10b respectively and each unit having a CPU 11 and memory 12 and connected by multiple links in an interconnect "link bundle" 16 and by a separate backchannel 18 (which may also include redundant links if desired). The Active unit 10a is coupled to an Active unit power supply 20a by an Active unit power cycler switch 22a and the Standby unit 10b is coupled to a Standby power supply 20b by Standby unit power cycler switch 22b. A first power cycler link 24a connects the Active unit 10a to the Standby power cycler switch 22b and a second power cycler link 24b connects the Standby unit 10b to the Active power cycler switch 22a.

The power cycler switches 22a and b and links 24a and b enable each unit to directly control the power to the other unit (the control must allow the power to be separately turned off and turned on and must default to the on state). The use of this additional hardware and the software required to support the hardware and to implement the detection mechanisms is described in detail below.

It should be noted that, as a side effect, this example embodiment also deals with detection and correction of some other classes of faults closely associated with conditions that can cause the split-brain condition (such as a "hung" peer unit). Although a primary function of this example is the detection and correction of the split-brain condition, an additional necessary part of the process is to correctly identify and treat these ancillary faults that in certain circumstances indicate split-brain while in other cases indicate correctable faults that do not cause the split-brain condition.

Lowering the Probability that Conditions which Cause Split-Brain can Occur

The first technique is to lower the probability that the conditions that cause split-brain can occur. Two types of failure that can cause these conditions are:
1. failure in the unit itself due to:
   hardware
   software
2. failure of the interconnect between the units.

A complete failure of the hardware or software in the peer unit does not result in a split-brain condition because, by definition, one of the units is effectively disabled and prevented from providing service. If this is the Active unit in an Active-Standby configuration, then the Standby will take over and service is unaffected. If it is the Standby unit in an Active-Standby configuration, then availability will be affected only in the event of a failure of the Active while the Standby remains unavailable. In an Active-Active configuration, a failure of either unit means that service is unaffected for protected resources as the remaining unit assumes all protected service that was being provided by the failed unit. In both the Active-Standby and Active-Active cases, as long as the condition is correctly diagnosed and treated, the failed unit will be returned to service, thus restoring the system to its previous redundant state without service interruption. The split-brain algorithm and approach described in the following sections addresses this issue as a subset of conditions that it recognizes in order to correctly diagnose the split-brain condition itself.

A failure of the interconnect causes communication to be lost between the peer units while leaving both units completely operational. This event does result in a split-brain condition. One way to lower the probability that failure of the interconnect can occur is by providing multiple physically independent links between the units (treated logically as a link "bundle" representing a single logical interconnect to the higher level software), each isolated from the other in terms of hardware as well as software data structures. In this way, although single links may still fail, the interconnect will remain in operation as long as at least one link in the bundle remains operational (albeit at reduced capacity). This interconnect redundancy increases the availability of the interconnect by ensuring that the probability of the loss of all of the links, and thus loss of all interconnect communication, being the cause of failure is very low. However, providing a link "bundle" does not eliminate the possibility that interconnect failure can occur and, as a result, other techniques must be employed as well.

Improved Detection Techniques

The objective of improved detection techniques is to ensure that should split-brain occur, the probability that it can occur without being recognized is not statistically significant. When loss of communication does occur, recognizing what caused it is important in determining what corrective action needs to be taken. Two additional techniques that can be employed to improve detection and help to isolate the exact cause of the lost communication ensuring a correct diagnosis and enabling correct treatment will now be described.

The first improved detection technique is aimed at differentiating a peer unit failure from an interconnect failure. By providing a separate dedicated communication channel (referred to here as the "backchannel") which is not used for interconnect data traffic, the diagnostic capability of the infrastructure to correctly determine a failed interconnect condition and accurately separate this condition from unit failures is improved so that as long as the backchannel and interconnect do not fail simultaneously the correct diagnosis is made. Note however, that should they both fail simultaneously, a diagnosis which prevents the condition from doing harm is still made. A "backchannel" communication path and a driver for it that operates at interrupt level (i.e., not at process level) must be provided by the platform implementation for use by the detection code (the backchannel usage and detection mechanism is described in more detail below).

In the following description of example embodiments there are two different contexts for code to run in the operating system (for example Cisco IOS®) of a processing unit: in the first context code to run is scheduled by the operating system (also known as the process level) and in the second context code is run in response to a hardware interrupt (also known as the interrupt level).

Also, in the following description a task or process context is said to be "hung" or to "hang" when it continues to execute but does not relinquish the CPU. In a run-to-completion operating system, for example Cisco IOS®, this means that that a task, or process, continues to execute on the CPU at process level to the exclusion of all other process contexts. An interrupt context is said to be hung when all interrupts remain disabled but the interrupt level code continues to execute to the exclusion of all other contexts.

The second improved detection technique is aimed at differentiating the cause of the unit failure. It is based on a system of keepalive signals (also called "heartbeats") and responses periodically sent over the interconnect. In this example embodiment, the keepalive messages are sent at process level, but received and processed at interrupt level.

The responses to the keepalive messages (keepalive acknowledgements, i.e., "ACKs") are also sent and received at interrupt level. This allows the code to distinguish between process level software "hangs" (usually due to a tight software loop preventing other process level code from being dispatched) and interrupt level "hangs" (software) or unit failures (hardware) that make the unit non-responsive. The algorithm is described in detail below.

Successfully Treating the Fault and Recovery Techniques

In the case where the split-brain condition does occur, a correct diagnosis can be made by the software using a combination of the techniques described above. When a split-brain condition is diagnosed, direct action can be taken to correct it. In cases where an exact diagnosis cannot be made, a split-brain condition is assumed and action is taken to correct it. Even in this latter case of uncertainty, the condition is successfully treated without affecting service.

The reason that the split-brain condition is assumed in cases where an exact diagnosis cannot be made is that the treatment will not impact service for protected resources (the redundant unit will take over if necessary and preserve the existing protected service) and that it is the only guaranteed safe action to take to correct a possible occurrence of split-brain. In the case of Active-Active configurations, any service being provided utilizing unprotected resources in the unit that is determined to be at fault will be affected until the problem is repaired.

A first treatment and recovery technique is to reset and reload the failed peer. Specific types of failures of the peer, such as software problems causing the peer to "hang" at process level or loss of the interconnect, can be correctly diagnosed if a backchannel is available and is functioning. The peer can be signaled to reset and reload itself which is described in more detail below. This signal over the backchannel instructing the peer to reload itself is known as a "soft reset". This will alleviate transient software problems by causing the software to reinitialize and restart and will reset hardware associated with the interconnect sufficiently so that, if this is not a permanent hardware failure or due to a physically damaged link, the communication can be restored.

The fact that resetting and reloading has been attempted once must be "remembered" by the split-brain state machine so that if the failure is diagnosed within some predetermined timeframe after the peer rejoins (or fails to rejoin through the interconnect but does reconnect using the backchannel), more appropriate recovery measures can be taken as described below.

This action of resetting and reloading must always be taken by the Active unit or, in the case of an Active-Active system, the Default Active unit, in order to preserve service and to ensure consistent and predictable behavior. The timers used to detect the lost signaling must be set by the algorithm used to ensure that a functioning [Default] Active always recognizes and treats the condition before the [Default] Standby can react and attempt a takeover.

If the backchannel is not available, or is not responding, the peer must be power cycled. Power cycling the peer is known as a "hard reset". When a failure of the peer to respond can be identified as either an interconnect failure (i.e., the backchannel is responding but the interconnect is not), or the failure of the peer cannot be diagnosed with certainty (e.g., neither the interconnect nor the backchannel is responding), or the previous reset attempt (described above) failed, then the power cycling control is used to cause the peer to be powered off then on ("power cycled").

This power cycling is accomplished by providing a mechanism that enables each unit to directly control the power to its peer unit as depicted in FIG. 1. This approach to recovery of the peer is based on the possibility that a complete power-off/power-on sequence will reset faulty hardware that is in some indeterminate state preventing it from operating correctly.

As stated above in the description of resetting and reloading of the peer, the action of power cycling the peer must always be taken by the Active or, in the case of an Active-Active system, the Default Active unit, in order to preserve service and to ensure consistent and predictable behavior.

A third treatment and recovery technique is to power down the peer until manual intervention can be arranged. One way to guarantee that split-brain cannot occur when it can be determined that one of the units is at fault and cannot be repaired, the interconnect is at fault and cannot be repaired, or a certain diagnosis cannot be made, is to ensure that one of the units is taken out of service and remains in the powered-down state until the problem is resolved. As set forth above in the description of power cycling the peer, this can be accomplished by providing a mechanism to control the power to the peer unit so that it can be powered off and remain off.

Powering down is the choice of last resort because it ensures that one of the units remains out of service. However, with certain types of permanent failures or the lack of sufficient evidence to allow an exact determination as to the cause of the communication failure, this approach, with the aid of manual intervention from the customer, does guarantee that a split-brain condition is prevented.

As described previously, the action to power down the peer must always be taken by the Active or, in the case of an Active-Active system, the Default Active unit, in order to preserve service and to ensure consistent and predictable behavior.

In an example embodiment the various functions described above are performed by finite state machines (fsm) implemented as software stored in the memories of the Active and Standby units and executed by the CPUs.

The notation used in all the state machines will now be described. An "action code" is inserted into each of the cells that corresponds to the intersection of an "Input Event" and a "State Name/Number". The "action code" has the following syntax:
1. n(fn) State transition to state "n" then execute function "fn".
2. /Cannot occur; filtered out by the logic in the code. No state transition takes place.
3. — No state transition takes place.
4. > Error condition; no state transition takes place.

The Backchannel State Machine

Table I illustrates the operation of an example backchannel finite state machine. In this example embodiment, the backchannel uses a simple protocol that sends and receives "keepalive" signals at interrupt level. This allows it to perform the task quickly, on a reliable basis and without concern for the anomalies of process dispatch. There is no requirement to send ACKs to the keepalive signals as both sides send on a regular short timer-based interval and the received keepalives act as verification that the other side is working. If the backchannel fails during operation, the interconnect is requested to send an immediate "test keepalive" message over the interconnect (see the description below of the "Interconnect Keepalive State Machine") which does require a response. This enables the algorithm to differentiate between a backchannel failure and a system wide communication failure.

This process of recognizing a CPU versus an interconnect failure using the backchannel can be optimized by performing a periodic keepalive (in both directions) at a short interval of half the desired detection time (e.g., 250 ms for a detection time between 250 ms. and 500 ms.). The backchannel is not required to have high bandwidth but must have low latency so that faults can be detected within small intervals. The following is a description of the algorithm The send count is initially set to zero. Every time a keepalive message is sent, the send count is incremented. Every time a keepalive message is received, the send count is cleared. If the backchannel send count threshold has been reached or exceeded, then the peer has not been heard from on the backchannel within the required interval. The interval must be short enough to give the desired detection time but long enough to ensure that the keepalive can be sent, received and processed without triggering the missing keepalive condition. This sampling technique means that the split-brain detection mechanism is not subject to the send/receive turnaround of the link and does not have to wait during the split-brain detection algorithm.

The backchannel is also used to provide a signal when the endpoint has determined that it has taken a non-recoverable fault. This somewhat emulates hardware support that most platforms provide when the two endpoints are located on the same motherboard—there, a hardware signal can raise an interrupt on the surviving endpoint from the faulting endpoint's fault handler. It can also be used to send a software signal to the peer endpoint to reset itself when some types of errors are detected. This enhances error detection because it is faster than waiting for the keepalive timeouts to detect the conditions. These messages may also be enhanced to carry additional information such as reason codes.

The backchannel does not send responses—both sides send keepalives on a specific interval. The receipt of a keepalive indicates the peer is alive and well at interrupt level. If this endpoint is receiving keepalives over the backchannel but not over the interconnect, then the interconnect has failed or the peer is in a process level loop. If this endpoint is receiving ACKs over the interconnect to its keepalives (over the interconnect), then the peer endpoint is in a process level loop (because the ACKs are successfully being sent at interrupt level but no keepalives are being sent at process level). If no keepalives or ACKs are being received over the interconnect but this endpoint is receiving keepalives over the backchannel. Then it is an interconnect and not a processor failure.

TABLE I

The Backchannel finite state machine and Actions.

| | BCfsm (event) | |
|---|---|---|
| Function: | This fsm manages the Backchannel link. It initiates and processes the keep-alives that it exchanges with its peer in order to determine if the peer is still executing. It maintains the backchannel link protocol and reports errors. | |
| Input: | event: | |
| | Begin | The backchannel link is to be initialized and the keep alive protocol is to be started. |
| | Reset | Reset the link and the fsm |
| | Send_KA | A keep alive needs to be sent to the peer endpoint. |
| | Recd_KA | A keep alive has been received from the peer. |
| | Send_KA_Failed | The keep alive send operation failed. |
| | KA_Timer_Expired | The keep alive timer (set whenever a keep alive is sent) has expired. |
| | Send_Peer_Down | A signal to send the peer a message that this endpoint has failed. |
| | Recd_Peer_Down | A signal that the peer endpoint has failed has been received. |
| | Send_Reset_Peer | A signal to send the peer a message requesting that it reset and reboot itself. |
| | Recd_Reset_Peer | A signal that the peer endpoint is requesting that this endpoint reset and reboot itself. |
| | Send_Test_BC | A signal to send the peer a message requesting that it immediately send a test response |

TABLE I-continued

The Backchannel finite state machine and Actions.

| | | |
|---|---|---|
| | Recd_Test_BC_ACK | ACK (to see if the link is still up).<br>A signal that the peer endpoint has sent a test response ACK. |
| | Recd_Test_BC | A signal that the peer endpoint is requesting that this endpoint immediately send a test<br>Response ACK (to see if the link is still up). |
| States: | Start | The state machine has not been initialized; this is the "Start" state. |
| | KA_Exchange | The state machine has sent one or more keep alives and is the keep alive protocol loop. |

| | state Name → | |
|---|---|---|
| input | Start | KA_Exchange |
| | state Number → | |
| Event ↓ | 1 | 2 |
| Begin | 2<br>(A) | > |
| Reset | — | 1<br>(B) |
| Send_KA | / | —<br>(C) |
| Recd_KA | / | —<br>(E) |
| Send_KA_Failed | / | —<br>(D) |
| KA_Timer_Expired | / | —<br>(D) |
| Send_Peer_Down | / | —<br>(F) |
| Recd_Peer_Down | / | —<br>(G) |
| Send_Reset_Peer | / | —<br>(H) |
| Recd_Reset_Peer | / | —<br>(I) |
| Send_Test_BC | / | —<br>(J) |
| Recd_Test_BC_ACK | / | —<br>(K) |
| Recd_Test_BC | / | —<br>(L) |

| Action | Function |
|---|---|
| A | // Begin has been signaled; initialize the link and ring buffers.<br>// Note: assumes the interconnect is up before the backchannel link is initialized.<br>// Allocate permanent send & receive buffers sufficient to support protocol<br>bcAllocateRing (&sendRing);<br>bcAllocateRing (&receiveRing);<br>// start with a keep alive msg<br>bcSendCount = 0;<br>bcCancelSendTimer( );<br>BCfsm(Send_KA); |
| B | // A Reset has been signaled<br>// cancel any outstanding timer, free the permanent buffers & take down the link as req'd<br>bcCancelSendTimer( );<br>bcDeallocateRing (&sendRing);<br>bcDeallocateRing (&receiveRing);<br>bcPlatformDriverReset( ); |
| C | // format & send the KA message<br>KAmsg = bcGetSendBuffer (sendRing);<br>bcFmtKAmsg (KAsmsg);<br>++ bcSendCount;<br>if (bcSendmsg (KAsmsg) != ok)<br>  BCfsm (Send_KA_Failed);<br>bcStartSendTimer( ); |
| D | // A send failure or timeout occurred<br>// if it's a failure, retry until permanent or success<br>// On a timeout, if we've sent bcMaxSendCount KAs without receiving a KA, then it's a failure;<br>// otherwise send another KA<br>// (if a send failure occurs, no timer is yet running)<br>if (bcSendCount > bcMaxSendCount)<br>{<br>  bcFreeSendBuffer (&KAsmsg);<br>  BCfsm (Reset); |

TABLE I-continued

The Backchannel finite state machine and Actions.

|   |   |
|---|---|
|   | SBfsm (BC_RetriesExhausted);<br>}<br>else<br>  BCfsm (Send_KA); |
| E | // We received a KA.<br>// This means that the other side is up and well so use the received KA as an ack to reset the wnidow.<br>// If the other side is not receiving our KAs, the fsm on that side will fail.<br>// (the timer for our last sent KA is still running)<br>bcSendCount = o;<br>bcFreeRcvBuffer (&KArmsg); |
| F | // This instance has taken a fault and is using the backchannel to make a last ditch effort to tell its<br>// peer that it has failed and will reboot. This is a software implementation of the functionality that<br>// most platform hardware implementations have in hardware on the motherboard (where both<br>// endpoints are on the same board) to immediately tell a peer system that it has failed. This signal<br>// is intended to be used from a fault handler when it has been decided that the fault represents an<br>// unrecoverable error and the system must be reset and rebooted. There is no guarantee, beyond<br>// any given by the platform driver, that the message will actually get out on the wire before the<br>// system fails.<br>// format & send the Peer_Down message<br>PDmsg = bcGetSendBuffer (sendRing);<br>bcFmtPDmsg (PDmsg);<br>if (bcSendmsg (PDmsg) != ok)<br>{<br>  bcFreeSendBuffer (&PDmsg);<br>  BCfsm (Reset);<br>  SBfsm (BC_PeerDownFailed);<br>} |
| G | // we have received a Peer_Down message from our peer. It has failed, so reset this fsm and signal<br>// the higher layers that the peer has gone away.<br>BCfsm (Reset);<br>SBfsm (BC_PeerFailed); |
| H | // the peer needs to be reset - this allows for a software directed soft reset<br>// format & send the Peer_Reset message<br>PRmsg = bcGetSendBuffer (sendRing);<br>bcFmtPRmsg (PRmsg);<br>if (bcSendmsg (PRmsg) != ok)<br>{<br>  bcFreeSendBuffer (&PRmsg);<br>  BCfsm (Reset);<br>  SBfsm (BC_PeerResetFailed);<br>} |
| I | // we have received a Peer_Reset message from our peer. It is requesting that this endpoint shut<br>// down and reboot, so reset this fsm and signal the higher layers that this endpoint needs to reboot.<br>bcFreeRcvBuffer (&PRrmsg);<br>BCfsm (Reset);<br>SBfsm (BC_ResetPeerReq); |
| J | // A request to send an immediate test message to see if the backchannel is up has been requested by<br>// SBfsm. The other side is required to respond immediately.<br>// format & send the test_BC message<br>testBCmsg = bcGetSendBuffer (sendRing);<br>bcFmtTestBCmsg (testBCmsg);<br>if (bcSendmsg (testBCmsg) != ok)<br>{<br>  bcFreeSendBuffer (&testBCmsg);<br>  BCfsm (Reset);<br>  SBfsm (BC_TestFailed);<br>} |
| K | // we have received a test_BC_ACK message from the peer. Tell the SBfsm that the backchannel is up.<br>bcFreeSendBuffer (&testBCACKmsg);<br>SBfsm (BC_TestACKRecd); |
| L | // we received a test_BC message. We need to respond immediately with a test_BC_ACK message.<br>// format & send the test_BC_ACK message<br>bcFreeRcvBuffer (&testBCrmsg);<br>testBCACKmsg = bcGetSendBuffer (sendRing); |

TABLE I-continued

The Backchannel finite state machine and Actions.

```
    bcFmtTestBCACKmsg (testBCACKmsg);
    if (bcSendmsg (testBCACKmsg) != ok)
    {
        bcFreeSendBuffer (&testBCACKmsg);
        BCfsm (Reset);
        SBfsm (BC_TestBCACKFailed);
    }
```

Table I illustrates the operation of an example embodiment.

The Interconnect Keepalive State Machine

Table II illustrates the operation of an example Interconnect Keepalive finite state machine. In order to detect certain peer failures and verify that the interconnect is operating correctly even when not being used by other traffic, a keepalive mechanism is used that sends periodic keepalive messages over the interconnect and responds with keepalive ACKs. This mechanism makes use of both process and interrupt level processing in order to detect and differentiate various types of failures.

Keepalive signals are sent at process level and received at interrupt level. The keepalive timer process is responsible for sending the keepalive signal at a predetermined interval. The interrupt handler receives and processes the keepalive signal, which indicates that the peer is still operating correctly.

The keepalive algorithm operates as follows. The mechanism is started at process level. The timer process is created as a high priority task in order to assure a regular service interval. It runs each time the timer expires and it:

1. sends the keepalive message to the peer;
2. increments the keepalive and ACK counts (the keepalive count is the count of the keepalives sent without receiving a corresponding keepalive from the other side while the keepalive ACK count is the number of keepalives sent without having received an ACK from the peer); and
3. checks the keepalive and ACK threshold levels to detect if they have been exceeded and takes appropriate action if they have.

Once the keepalive signal has been sent, both the keepalive and ACK counts are checked to see if any of the thresholds have been exceeded. Both thresholds are checked and, if either one is exceeded, then the peer is considered "down". Note that the timer values used on the [Default] Active and the [Default] Standby are set differently with the [Default] Active having the smaller value. This prevents both sides from attempting to recover the peer at the same time if a keepalive failure occurs and ensures that the action of the [Default] Active always takes precedence. These timer values are managed internally by the implementation and the correct relationship between the timer values on the peers is maintained.

The interrupt level is responsible for receiving the keepalive message from the peer unit. Upon receipt, the keepalive count is reset to 0 to indicate that keepalives are being sent by the peer—i.e., the peer is functioning correctly at process level. The interrupt level is also responsible for responding to the keepalive heartbeats with a keepalive ACK. Received ACKs are also processed at interrupt level. Receipt of an ACK resets the ACK count to 0 to indicate that the peer is operating correctly at interrupt level.

If neither threshold has been exceeded when checked, then the system is running normally and everything is functioning as expected. If a threshold is exceeded, then:

1. The keepalive ACK threshold must be checked first. If it has been exceeded, then keepalives have been sent, but ACKs have not been received. This means one of three possible conditions exists:
   a. The peer is hung at interrupt level.
   b. The peer hardware has failed in such a way that it is not processing.
   c. The interconnect has failed (this would be a directional failure rather than a complete link failure which would be detected on a send on this side).

The difference between conditions a and b cannot be detected. For the purposes of split-brain detection and treatment, this does not matter. In order to determine whether this is a link failure or a unit failure, a signal is sent to the Split-Brain fsm specifying the detected event. The Split-Brain fsm will take the appropriate action based on previous actions and its knowledge of whether this is an end-point failure or an interconnect failure. In any case, this fsm is reset, as the peer is not operational for its purpose.

2. If the keepalive count has exceeded the defined threshold, then the peer is hung at process level. This event is also reported to the Split-Brain fsm which will take appropriate action. This fsm is reset, as the peer is not operational for its purpose.

TABLE II

The Interconnect Keepalive finite state machine and Actions.

| ICKAfsm (event) | | |
|---|---|---|
| Function: | This fsm manages the Interconnect keep alive protocol. | |
| Input: | event: | |
| | Begin | The interconnect link is initialized, the role has been determined and any necessary negotiation has been done. The keep alive protocol is initialized and started. |
| | Reset | Reset the fsm. |
| | KA_Timer_Expired | The keep alive timer (set whenever a keep alive is sent) has expired. |
| | KA_recd_ACK | A keep-alive ACK has been received. |
| | KA_recd_KA | A keep-alive has been received. |
| | Send_Test_KA | Send a special test message to the peer endpoint to see if it is still alive. |

TABLE II-continued

The Interconnect Keepalive finite state machine and Actions.

| | | |
|---|---|---|
| States: | Recd_Test_KA | Received a response to the special test message from the peer to indicate that it is still alive. |
| | Start | The state machine has not been initialized; this is the "Start" state. |
| | KA_Exchange | The state machine has sent one or more keep alives and is the keep alive protocol loop. |

| Input | State Name → | |
|---|---|---|
| | Start | KA_Exchange |
| | State Number → | |
| Event ↓ | 1 | 2 |
| Begin | 2 (A) | > |
| Reset | / | 1 (X) |
| KA_timer_expired | / | — (B) |
| KA_recd_ACK | / | — (C) |
| KA_recd_KA | / | — (D) |
| Send_Test_KA | / | — (E) |
| Recd_Test_KA | / | — (F) |

| Action | Function |
|---|---|
| A | // Begin signaled and fsm is in Reset state.<br>// The interconnect is up and role is determined; any necessary negotiation has been done.<br>// Perform init and start keep alives.<br>// KA_count is the count of KAs sent without receiving a corresponding KA from the peer<br>// KA_ACK_count is the count of KAs sent without receiving a corresponding ACK from the peer<br>KA_count = 0;<br>KA_ACK_count = 0;<br>// set the appropriate timer value based on endpoint role<br>// the [Default]Standby time interval must always be greater than the [Default]Active time interval<br>if (Active \|\| DefaultActive)<br>   timerValue = activeTimerValue;<br>else<br>   timerValue = standbyTimerValue;<br>// now send the first KA, start the timer and bump the counts<br>icSendKA( );<br>icStartTimer(timerValue);<br>++KA_count;<br>++KA_ACK_count; |
| B | // send KA has timer expired<br>if (KA_ACK_cnt > max_KA_ACK_cnt)    // keep-alive ACK counter exceeded?<br>{    // one of: a) peer hung at interrupt level<br>    //      b) peer is down/otherwise disabled<br>    //      c) interconnect is down<br>  ICKAfsm (Reset);    // first reset this fsm<br>  SBfsm (ICKA_PeerDownDisabled);    // then tell the SBfsm what happened<br>}<br>else if (KA_cnt > max_KA_cnt)    // keep-alive send count exceeded?<br>{    // then peer is in process level loop<br>  ICKAfsm (Reset);    // first reset this fsm<br>  SBfsm (ICKA_PeerDownEnabled);    // then tell the SBfsm what happened<br>}<br>else    // all ok so send the KA, start the timer again and bump the<br>{    // counts<br>  ICSendKA( );<br>  ICStartTimer(timerValue);<br>  ++KA_count;<br>  ++KA_ACK_count;<br>} |

TABLE II-continued

The Interconnect Keepalive finite state machine and Actions.

| | |
|---|---|
| C | // received ACK - reset ACK count to o to start new window<br>KA_ACK_count = o; |
| D | // received KA - reset KA count to o to start new window<br>KA_count = o; |
| E | // A request to test to see if the peer is still alive has been received from the SBfsm, typically because<br>// the BCfsm has reported a failure to it (it has lost communication with it's peer over the backchannel).<br>// We send a KA_test message which is both sent and received at interrupt level (this has the effect<br>// that it is sent at the head of the queue). It requires an immediate response which comes in<br>// asynchronously.<br>ICSendKAtest ( ); |
| F | // We received the response to the KAtest message, so inform the SBfsm.<br>SBfsm (ICKA_TestRecd); |
| X | // A reset has been requested<br>// not much to do - just make sure that the timer is no longer armed; the other variables will be<br>// correctly reinitialized when the "Begin" signal is received by the fsm<br>icCaneclTimer( ); |

Table II illustrates the operation of an example embodiment.

The Power Cycler State Machine

Table III illustrates the operation of an example Power Cycler finite state machine. As described previously, a power cycler is used in some cases to either attempt to recover the peer by causing the hardware to be reset through a power-off/power-on sequence or keep it down until it has been repaired using only a power-off. The exact conditions under which each of these approaches is applied is described below with reference to "The Split-Brain State Machine".

The power cycler fsm supports three operations:
1. on: this turns the power to the peer on
2. off: this turns the power to the peer off
3. cycle: this causes the power to the peer to be cycled; i.e., to be turned off and then back on. Note that the sequence may require that a delay ("soaking time") be introduced between the time the peer is turned off and the time power is reapplied for correct operation—this is specified by the platform and is used during the cycle operation.

TABLE III

The Power Cycler finite state machine and Actions.

PCfsm (event)

| | | |
|---|---|---|
| Function: | This fsm manages the Power Cycler. | |
| Input: | event: | |
| | Begin | The fsm has not yet been initialized. The default state of the power cycler is "on". |
| | Reset | Reset the fsm |
| | PowerOn | Power on the peer. |
| | PowerOff | Power off the peer. |
| | PowerCycle | Cycle the peer off then back on. A soaking interval is used to allow the hardware devices on the peer to settle before they are powered back on. |
| | TimerExpired | The timer representing the soaking interval used for the PowerCycle event has expired. |
| States: | Start | The state machine has not been initialized. |
| | On | The power cycler is on. |
| | Off | The power cycler is off. |
| | Cycling | The timer is running for the soaking interval because of a "PowerCycle" event. |

| | State Name → | | | |
|---|---|---|---|---|
| Input | Start | On | Off | Cycling |
| | State Number → | | | |
| Event ↓ | 1 | 2 | 3 | 4 |
| Begin | 2<br>(A) | > | > | > |
| Reset | / | 1<br>(X1) | 1<br>(X2) | 1<br>(X3) |
| PowerOn | / | — | 2<br>(B) | > |
| | | — | | |

TABLE III-continued

The Power Cycler finite state machine and Actions.

| | | | | |
|---|---|---|---|---|
| PowerOff | / | 3 (C) | — | > |
| PowerCycle | / | 4 (D) | 4 (E) | > |
| TimerExpired | / | / | / | 2 (F) |

| Action | Function |
|---|---|
| A | // perform init.<br>// Note that the power cycler must default to "on" so that when neither box is up they will both<br>// be powered and able to be booted.<br>InitPowerCycler( ); |
| B | // Power on request<br>PowerOnPowerCycler( ); |
| C | // Power off request<br>PowerOffPowerCycler( ); |
| D | // Power cycle request when the power cycler is on; first power off then set the timer for the specified<br>// soaking interval. When it expires, the "TimerExpired" event will turn the power cycler back on.<br>PowerOffPowerCycler( );<br>pcStartTimer(pcSoakingInterval); |
| E | // Power cycle request when the power cycler is off; since it is already off just set the timer for the<br>// specified soaking interval. When it expires, the "TimerExpired" event will turn the power cycler back<br>// on.<br>pcStartTimer(pcSoakingInterval); |
| F | // The timer set when the "PowerCycle" event was processed has expired. The soaking interval<br>// specified by this platform was used. Now it is safe to power the peer back on.<br>PowerOnPowerCycler( ); |
| X1 | // Since the power cycler is on, leave it that way |
| X2 | // The power cycler is off, so set it back on (the default state) before the reset<br>PowerOnPowerCycler( ); |
| X3 | // The timer is outstanding because of a power cycle request so we first need to cancel the timer<br>// then power it back on (the default state).<br>pcCancelTimer( );<br>PowerOnPowerCycler( ); |

Table III illustrates the operation of an example embodiment.

The Split-Brain State Machine

Table IV illustrates the operation of an example of the top level Split-Brain Detection and Recovery finite state machine. It depends on input from several other sources in order to detect external events that can affect the split-brain diagnosis and manages the lower level state machines. Based on the external events reported to it, the state machine effects actions which recover from and repair or, at a minimum, prevent the split-brain condition until the system can be manually repaired with little or no impact to service.

There are several events that are presented to the state machine: external signals from drivers, internally generated events by the state machine itself and events coming from either the Interconnect Keepalive state machine (ICKAfsm) or the Backchannel state machine (BCfsm).

In this example embodiment the split-brain state machine operates as follows. The IC (interconnect) and BC (backchannel) initialization is done by platform drivers and is signaled to the Split-Brain (SB) fsm via external signals from the drivers. The platform drivers have the responsibility to detect link down conditions (and to signal the condition to SBfsm) as well as to restart the link when it is down. There are several events that are signaled to the state machine from external sources:

Interconnect up signal: This is a signal coming from an external driver to indicate the detection of the interconnect up. The Split-Brain fsm needs to drive the initialization of the ICKA fsm once this signal is detected.

Signals indicating that the peer is down or the IC is not working: These are signals that are coming from the Interconnect Keepalive finite state machine(ICKAfsm) to the Split-Brain finite state machine (SBfsm). These signals are either:

a) peer down disabled signal (keepalive ACK counter exceeds threshold):
  i. peer is hung at interrupt level
  ii. peer is down
  iii. interconnect is down In order to allow the signal sent by the Split-Brain fsm over the BC transport to work before the peer attempts to take over, the (detection time+BC signal time+BC response time+BC processing time+some safety factor) must be <(the peer standby takeover timeout value) when detected by the Default Active (the safety factor should be calculated to ensure that the Default Standby can never detect the condition before the Default Active as long as the Default Active is still operational). If detected on the Default Standby and the Default Active has not yet acted (based on the timer assumption stated above) then either case (i) or (ii) must have occurred. If the backchannel is not available, then the Default Active will have its detection timer set to a value less than that of the Default Standby so that it will detect the condition first (if it is not down or hung) and will power cycle the peer. If the Default Active is not up (or is disabled), the Default Standby will detect the condition, power cycle the Default Active, and take over service (becoming the Active).

In order to allow the Default Standby to react to the failure as quickly as possible, since it knows that either case (i) or case (ii) must exist when it detects the condition, it power cycles the peer and starts a timer to detect whether the peer returns to service and rejoins. If the peer recovers then normal operation is continued; otherwise, the peer is powered down to ensure that it is removed from operation until it can be fixed. In the case where this failure is detected on the Default Active and a backchannel is available, then a test message is sent using the BC to see if the problem is with the interconnect (i.e., case (iii)). If a response is received over the backchannel, then an interconnect failure has occurred and corrective action is taken by power cycling the peer; or b) peer down enabled signal: i.e., only the keepalive counter exceeds threshold and interrupt enabled code is executing in a tight loop on the failing unit. Based on the timer assumptions stated above, the Default Active detects the problem before the Default Standby. To resolve the problem, the failing unit is reset. When a backchannel is available, the reset takes place via a "soft reset" signal over the backchannel to allow the other unit to perform any clean up tasks before going down. This is usually cleaner than just power cycling the failing unit. When the backchannel is not available, then the only option is to reset the peer unit using the power cycler.

An IC down signal coming from an external driver: This signal is treated the same as for an interconnect down in case (iii) above.

A peer is down message sent over the backchannel: This indicates that the peer has failed and has sent us a "soft" failure message indicating it is going down. This causes the state machines to be reset waiting for the peer to return.

A timer expires when sending a test keepalive signal over the interconnect. This timer was started due to the backchannel exceeding its threshold. The event itself is internal to the SB state machine as is the timer. There are two possible reasons for the backchannel to exceed its threshold:

a) The BC is not working but the peer is up: In this case the interconnect is still up and will respond to the test keepalive signal that is sent. The BCfsm is reset and the BC is not utilized until it returns.

b) Either the peer is down or both IC and BC are down: In this case, the BC timeout occurs and the IC does not respond. The peer is power cycled in an attempt to correct the problem. If the peer does not return within a specified time limit, the peer is powered off until it can be manually repaired and returned to service.

A backchannel up signal: This is a signal coming from an external driver to indicate that the BC is up. The split-brain state machine initializes the BCfsm when it receives this signal.

When attempting to reset the peer using a soft reset over the backchannel, the backchannel fails and the signal is not sent. In order to reset the Default Standby, it is power cycled to attempt to correct the problem.

A soft reload request is received from the peer over the backchannel signaling the need to reset after performing any necessary cleanup. A last gasp message is sent out over the backchannel to indicate this unit is going down, and then the system is reloaded.

The timer expires after a test keepalive signal was sent over the backchannel: This was done because the interconnect exceeded its threshold. Because of the timer rules, this is only detected by the Active. The event itself is internal to the state machine as is the timer. There are two reasons that the interconnect might exceed its threshold:

a) The IC is not working but the peer is up: In this case the timer should not expire for the backchannel signal because the peer is still up and will respond to the test keepalive signal. The Standby needs to be reset using the soft reset signal over the backchannel.

b) Either the peer is down or both IC and BC are down: In this case, the BC timeout occurs and the IC does not respond. The peer is power cycled in an attempt to correct the problem. If the peer does not return within a specified time limit, the peer is powered off until it can be manually repaired and returned to service.

In the case where there is an attempt to send a test keepalive signal over the interconnect but the message cannot be sent the split-brain fsm is notified to take action (testAckFailed). This signal occurs on the Default Active when the Default Active detects the situation before the Default Standby notices because the Default Active is up and the timer rules described earlier are in effect. In the case where the Default Active unit is hung at interrupt level, or the peer is down (so that the signal cannot be received and processed), the Default Standby detects this first. In either case, the unit that detects the condition power cycles the peer.

When BCfsm on the Default Standby receives a backchannel keepalive and cannot send the ACK then the BC_testBCfailed is signaled. In this case the Default Standby needs to reset itself since the peer cannot get the response and eventually will timeout and attempt to reset the Default Standby utilizing the power cycling link to switch off and then switch on the power cycling switch. This optimizes that detection by cutting it short.

TABLE IV

| The Split-Brain Detection and Recovery finite state machine and Actions. |
|---|

| SBFsm (event) |
|---|

| Function: | This fsm manages the split Brain state machine. It handles events from the other fsms as well as it self and takes actions accordingly | |
|---|---|---|
| Input: | event: | |
| | Begin | The fsm has not yet been initialized. Initialize and get the state machine ready |
| | Reset | Reset the fsm |
| | SB_ICup | an external signal from the platform driver to indicate an interconnect is up |

TABLE IV-continued

The Split-Brain Detection and Recovery finite state machine and Actions.

| | | |
|---|---|---|
| | SB_BC_PC_timer_expired | the peer was power cycled but did not come back and join within the timer period. |
| | SB_BCup | an external signal from the platform driver to indicate the backchannel is up and operational |
| | SB_BCdown | an external signal from driver to indicate the BC has went down |
| | SB_ICdown | an external singal from driver to indicate the IC has went down |
| | SB_Test_ICKA_timer_expired | timer expired while waiting for an ACK back from the IC test KA msg |
| | SB_Test_BC_timer_expired | timer expired while waiting for an ACK back from the BC test KA msg |
| | SB_PeerDown_Standby | Peer down detected on the Standby |
| | SB_PeerDown_Active | Peer down detected on the Active |
| | BC_RetriesExhuasted | BC KA threshold have been exceeded |
| | BC_PeerDownFailed | Peer down message to the peer has failed |
| | BC_PeerFailed | The peer has failed |
| | BC_PeerResetFailed | Peer reset message to peer to reset itself has failed |
| | BC_ResetPeerReq | received a peer request to reset ourselves |
| | BC_TestAckFailed | Attempting to send a test KA message to the peer has failed from the Active |
| | BC_TestBCFailed | Attempting to send a an ACK for the test KA has failed |
| | ICKA_PeerDownDisabled | KA ACK threshold has been exceeded in the ICKA state machine |
| | ICKA_PeerDownEnabled | KA threshold has been exceeded in the ICKA state machine |
| | ICKA_TestRecd | Received an ACK over the IC for the test KA message |
| States: | Start | The state machine has not been initialized. |
| | Inited | The state machine has been initialized |
| | BC up | The backchannel is up and running sending KA (but the interconnect is not) |
| | PC Timer Running | The Power cycler timer is running waiting for the peer to clear error condition and return |
| | IC/BC up | Both the interconnect and backchannel are up |
| | IC up | the interconnect is up and sending messages (but the backchannel is not) |
| | BC timer | Sent a test message over the BC and running a timer waiting for a response or timeout |
| | ICKA timer | Sent a test message over the IC and running a timer waiting for a response or timeout |

| Input | State Name → | | | | | | | |
|---|---|---|---|---|---|---|---|---|
| | Start | Inited | IC up | BC Up | PC Timer Running | IC/BC up | BC timer | ICKA timer |
| | | | | | State Number → | | | |
| Event ↓ | 1 | 2 | 3 | 4 | 5 | 6 | 7 | 8 |
| Begin | 2 (A) | > | > | > | > | > | > | > |
| Reset | — | 1 (B) | 1 (B) | 1 (B) | 1 (B) | 1 (B) | 1 (B) | 1 (B) |
| SB_ICup | / | 3 (C) | > | 6 (C) | 3 (D) | > | > | > |
| SB_ICdown | / | > | 5 (E) | > | / | 5 (U) | 5 (E) | / |
| B_BC_PC_timer_expired | / | / | / | / | — (F) | / | / | / |
| SB_BCup | / | 4 (G) | 6 (H) | / | 4 (G) | > | / | / |
| SB_BCdown | / | > | / | 3 (I) | / | 3 (I) | / | 3 (I) |
| SB_Test_ICKA_timer_expired | / | / | / | / | / | / | / | 5 (J) |
| SB_Test_BC_timer_expired | / | / | / | / | / | / | 5 (K) | / |
| SB_PeerDown_Standby | / | / | / | / | / | 5 (E) | / | / |
| SB_PeerDown_Active | / | / | / | / | / | 7 (L) | / | / |
| SB_Failure_timer_expired | / | / | — (Z) | — (Z) | — (Z) | — (Z) | — (Z) | — (Z) |
| BC_RetriesExhuasted | / | / | / | / | / | 8 (M) | / | / |
| BC_PeerDownFailed | / | / | / | — (N) | / | — (N) | / | / |
| BC_PeerFailed | / | / | / | — (O) | / | — (O) | / | / |
| BC_PeerResetFailed | / | / | / | — (P) | / | — (P) | / | / |
| BC_ResetPeerReq | / | / | / | — (Q) | / | — (Q) | > | > |
| BC_TestACKRecd | / | / | / | / | / | / | 5 (R) | / |

TABLE IV-continued

The Split-Brain Detection and Recovery finite state machine and Actions.

| | | | | | | | | |
|---|---|---|---|---|---|---|---|---|
| BC_TestBCFailed | / | / | / | / | / | / | 5 (S) | / |
| BC_TestACKFailed | / | / | / | — (T) | / | — (T) | / | / |
| ICKA_PeerDownDisabled | / | / | 5 (E) | / | / | — (U) | / | / |
| ICKA_PeerDownEnabled | / | / | 5 (V) | / | / | 5 (W) | / | / |
| ICKA_TestRecd | / | / | / | / | / | / | / | — (X) |

| Action | Function |
|---|---|
| A | // Begin has been signaled; initialize the state machine and wait for external signals<br>SBInit( );<br>FailureCount = o; |
| B | // A Reset has been signaled<br>// Cancel the SB timers then make sure other fsms are reset as well (since this is the master fsm).<br>FailureCount = o;<br>SBCancelICKATimer( );<br>SBCancelBCTimer( );<br>SBCancelBCPCTimer( );<br>SBCancelFailureTimer( );<br>BCfsm(Reset);<br>ICKAfsm(Reset);<br>PCfsm(Reset); |
| C | // Interconnect up signal<br>// The interconnect is up and any necessary negotiation has been done. (We consider the "interconnect" as<br>// a "link bundle"; the upper layers manage the bundle. Here we only care that there is a logical interconnect<br>// active between the two endpoints, not how many physical links make it up.) We're ready to start the<br>// interconnect Keep Alive state machine.<br>ICKAfsm (Begin);                  // initialize the ICKA fsm |
| D | // Interconnect up signal while the Power Cycler timer is still running<br>// Cancel the timer so it does not expire, then start the ICKAfsm( ).<br>SBCancelBCPCtimer( );             // Cancel the timer first<br>ICKAfsm(Begin)                    // IC is up - init the ICKA fsm |
| E | // This action is taken when there is no BC available and one of SB_ICdown, SB_PeerDown_Standby, or<br>// ICKA_PeerDownDisabled is received. This could be because:<br>//      a) peer is hung at interrupt level<br>//      b) peer is down/disabled<br>//      c) the interconnect is down<br>// Since no backchannel is available to further isolate the cause, we immediately powercycle the peer.<br>// If the Default Active is available, it will detect the condition first (because of the timer rules) and rest the<br>// peer (the Default Standby) before it detects the condition and resets the Default Active. If the<br>// Default Active is not available, the Default Standby will detect the condition and reset it.<br>PCfsm(PowerCycle);                // cycle peer since there is not BC and interconnect is down<br>SBStartBCPCTimer(timer_value);    // start a timer<br>FailureCount++;                   // increment failure count<br>SBStartFailureTimer(timer_value); // start a failure timer |
| F | // Power cycler timer expired - we have not heard back from peer (i.e., no IC up signal)<br>// This indicates that resetting the peer did not correct the condition, so we need to power down<br>// the peer and wait for manual intervention<br>FailureCount = o;                 // reset the failure count<br>SBCancelFailureTimer( );          // stop the failure timer peer is down<br>PCfsm(PowerOff);                  // take the peer down<br>SBfsm(Reset);                     // reset our state machine since peer is going down |
| G | // backchannel up signal while PC timer is running<br>// cancel the timer so it does not expire, and initialize the BC fsm.<br>SBCancelBC_PCtimer( );            // Cancel the timer<br>BCfsm(Begin);                     // init the BC fsm<br>PCfsm(PowerOff);                  // Power Down the peer<br>FailureCount = o;                 // reset failure count<br>SBCancelFailureTimer( );          // Cancel failure timer |

TABLE IV-continued

The Split-Brain Detection and Recovery finite state machine and Actions.

| | |
|---|---|
| H | // Back channel has been detected while IC is already up<br>BCfsm(Begin);　　　　　　　　　// initialize the BC fsm |
| I | // The BC is down. Continue to operate without a BC<br>BCfsm(Reset);　// Reset the BC fsm |
| J | // ICKA Test Keep Alive timer has expired when sending a test keepalive signal over the interconnect.<br>// This timer was started due to the backchannel exceeding its threshold. In response we sent a Test KA<br>// over the IC.<br>// So, either the peer is down or both IC and BC are down: In this case, the IC does not respond.<br>// To try to let the peer correct the problem, we power cycle the peer and start a timer to track whether<br>// the peer rejoins the configuration (SBStartBCPCTimer( )).<br>PCfsm(PowerCycle);　　　　　// reset peer with cycler since there is no msg path<br>SBStartBCPCTimer(timer_value) ;　// start a timer to track the peer's return<br>FailureCount++;　　　　　　// increment failure count<br>SBStartFailureTimer(timer_value);　// start a failure timer |
| K | // BC test keep alive timer has expired when sending a test keepalive signal over the backchannel.<br>// This timer was started because we sent a test keepalive over the backchannel to see if the IC failure<br>// was (a) because the IC was down or, (b) because the peer has failed. Since we didn't<br>// receive a response on the backchannel, either (a) the peer is down or, (b) the IC and BC are both down.<br>// To try to let the peer correct the problem, we power cycle the peer and start a timer to track whether<br>// the peer rejoins the configuration (SBStartBCPCTimer( )).<br>PCfsm(PowerCycle);　　　　　// cycle peer since there is not BC and interconnect is down<br>SBStartBC_PCTimer(timer_value)　// start a timer<br>FailureCount++;　　　　　　// increment failure count<br>SBStartFailureTimer(timer_value);　// start a failure timer |
| L | // A SB_PeerDown_Active signal has been injected because we received an IC_PeerDownDisabled signal<br>// on the Default Active with the BC up. One of the following conditions exist:<br>//　　　a) peer is hung at interrupt level<br>//　　　b) peer is down/disabled<br>//　　　c) the interconnect is down<br>// Use the BC to detect whether it is ((a) or (b)) or (c). If we get a response on the BC, it's (c); otherwise<br>// it's (a) or (b).<br>BCfsm(Send_Test_BC);　　　　// send a test KPA over BC<br>SBStartBCTimer(timerValue);　　// start a timer to make sure we get the response |
| M | // Back Channel exceeded its threshold without getting a response<br>// We need to try and determine if this is a BC interconnect failure or something else. We initiate a<br>// test KPA over the interconnect (note that the test KPA must be implemented as an immediate request<br>// and response over the interconnect at interrupt level in order to ensure that the condition is determined<br>// with the smallest possible latency).<br>// Start a timer to make sure that we get an ACK back over the interconnect. If we don't, we know there<br>// are more serious problems.<br>ICKAfsm(Send_Test_KA);　　　// send a KA over interconnect<br>SBStartICKATimer(timerValue);　// start timer |
| N | // Back channel peer down message send has failed from the BCfsm.<br>// Since we are already going down and being called at interrupt level by the fault handler, just reset this<br>// fsm.<br>SBfsm(Reset); |
| O | // We have received a peer down signal from our peer.<br>// It has failed, so reset this fsm (which will also reset the other fsms).<br>SBfsm(Reset); |
| P | // Back Channel reset peer message send has failed from the BCfsm<br>// Since resetting the peer through the BC failed, we need to do it using the power cycler.<br>PCfsm(PowerCycle);　　　　　// cycle power to get a reset of the peer |

TABLE IV-continued

The Split-Brain Detection and Recovery finite state machine and Actions.

| | |
|---|---|
| | SBStartBC_PCTimer(timer_value)    // start a timer<br>FailureCount++;    // increment failure count<br>SBStartFailureTimer(timer_value);    // start a failure timer |
| Q | // A Peer_Reset message has been received from our peer through the BC. We need to shut down and<br>// reboot.<br>// First send a last gasp message indicating that we are going down. Then reset the fsm so that any<br>// spurious events will be ignored, then cause this system to be reloaded.<br>BCfsm(Send_Peer_Down);    // last gasp message<br>SBfsm(Reset);    // reset our state machine<br>system_reload( );    // reload the system |
| R | // BC Test response received from peer. We originally sent the test over the BC because the IC had<br>// exceeded its threshold and was considered down. This confirms that this is an interconnect problem and<br>// not a failure of the peer. Since we cannot continue to operate correctly without an interconnect, we<br>// need to cause the peer to reload itself. Since the peer is still up, we use a "soft reset" to allow it to<br>// restart gracefully. (Note that this condition can only be detected by the Active and only the Standby<br>// is reset in this way.) We also start a timer to detect whether the peer returns.<br>SBCancelBCTimer( );    // cancel the timer for the BC<br>ICKAfsm(Reset);    // reset ICKA state machine<br>BCfsm(Send_Peer_Down);    // ask peer to reload itself<br>SBStartBC_PCTimer(timer_value);    // start a timer<br>FailureCount++;    // increment failure count<br>SBStartFailureTimer(timer_value);    // start a failure timer |
| S | // A request to send an immediate test message to see if the backchannel is up was requested by<br>// SBfsm. The send failed. (So both the BC and the IC appear to be down. Note that this condition can<br>// only be detected by the Active and only the Standby is reset in this way.)<br>// Powercycle the peer in an attempt to fix the problem.<br>PCfsm(PowerCycle); // cycle peer since there is not BC and interconnect is down<br>SBStartBCPCTimer(timer_value);    // start a timer<br>FailureCount++;    // increment failure count<br>SBStartFailureTimer(timer_value);    // start a failure timer |
| T | // A TestBCACK failed. This condition can occur only on the Default Standby when attempting to send an<br>// ACK in response to the TestBC that was received. We reset ourselves since the peer will eventually<br>// timeout and reset us because it did not receive the ACK.<br>system_reload( ); |
| U | // Peer Down disabled signal from ICKA fsm<br>// this could be because:<br>//    a) peer is hung at interrupt level<br>//    b) peer is down/disabled<br>//    c) the interconnect is down<br>// We use the backchannel to further isolate the cause only if we are on the Default Active. If we are<br>// on the Default Standby we already know that it is either case (a) or (b); otherwise, the Default Active<br>// would have already detected the condition (because of the difference in the timer detection values on<br>// the two) and caused the Default Standby to be reset. Since we are still running (on the Default Standby),<br>// the peer (the Default Active) must be down. In this case we want it to detect and react to the failure as<br>// quickly as possible. So instead of attempting a signal over the BC, we immediately powercylce<br>// the peer (the Default Active).<br>if( IsDefaultStandbyBox( ) )<br>    SBFsm(SB_PeerDown_Standby);    // inject event to indicate happening on Standby<br>else<br>    SBFsm(SB_PeerDown_Active);    // inject event to indicate happening on Active |
| V | / ICKA_PeerDownEnabled signal from ICKA fsm and only the IC is up:<br>// This means that the peer is stuck in a process level loop preventing the IC |

TABLE IV-continued

The Split-Brain Detection and Recovery finite state machine and Actions.

| | |
|---|---|
| | keepalive signal from<br>// being sent. We need to reset it to recover. Since the BC is not available, powercycle the peer.<br>PCfsm(PowerCycle)       // power cycle<br>SBStartBCPCTimer(timer_value);                              // start the timer<br>SBfsm(Reset);             // then reset this fsm<br>FailureCount++;           // increment failure count<br>SBStartFailureTimer(timer_value);                            // start a failure timer |
| W | // ICKA_PeerDownEnabled signal from ICKA fsm and both IC and BC are up:<br>// This means that the peer is stuck in a process level loop preventing the IC keepalive signal from<br>// being sent. We need to reset it to recover. Use the BC to send a "soft reset" signal to peer.<br>BCfsm(Send_Reset_Peer);                                      // send signal to peer over BC to reset itself<br>SBStartBCPCTimer(timer_value);                              // start the timer<br>FailureCount++;           // increment failure count<br>SBStartFailureTimer(timer_value);                            // start a failure timer |
| X | // The IC Test KA response was received from peer over the IC within the timeout. This indicates that<br>// it is a BC problem.<br>// Stop the IC timer then and reset the BC fsm awaiting the SB_BCup signal from the platform driver<br>// to restart the BC fsm.<br>SBCancelICKATimer( );    // Cancel the timer; we got the ACK.<br>BCfsm(Reset); |
| Z | // The Failure timer limit has expired. If the peer has exceeded its failure threshold count, then power it<br>// down; such failures are considered unrecoverable through programmatic means and require manual<br>// intervention. If not, then just reset the peer failure count and cancel the timer.<br>If (FailureCount > FailureThreshold)<br>{<br>   PCfsm(PowerOff);        // power off the peer<br>}<br>SBfsm(Reset);             // reset the state machines including the failure count |

Table IV illustrates the operation of an example embodiment.

The invention has now been described with reference to the example embodiments. Alternatives and substitutions will now be apparent to persons of skill in the art. For example, embodiments utilizing various state machines implemented in software have been described that perform the functions of detection of and recovery from the split-brain. These function can be implemented by different combinations of state machines, or combinations of hardware and software.

Additionally, although some of the example embodiments have utilized a dual-processor system, other example embodiments can be implemented on any number of processors (including two) either in the same "system" or in separate physical systems. It can also work as well for many-to-one systems as well as one-to-one Active-Standby systems (and Active-Active systems too). This can also be implemented in separate processes (a software mechanism) rather than separate physical processors—i.e., redundant processes rather than redundant processors. This can also be implemented in virtual machine where each "system" is a virtual machine. Accordingly, the term "peer unit" or "peer processing unit" is to be interpreted to cover any of the above-described configurations or implementations.

Accordingly, it is not intended to limit the invention except as provided by the appended claims.

What is claimed is:

1. A method comprising:
   detecting loss of signaling between active and standby peer processing units in a high-availability system, with the active and standby peer processing units connected by an interconnect over which interconnect keepalive signals are sent between active and standby peer processing units and over which interconnect acknowledge signals responsive to the interconnect keepalive signals are sent between the active and standby peer processing units and where the standby processing unit takes over functions of the active processing unit should the active processing unit fail;
   diagnosing a cause of loss of signaling if loss of signaling is detected at either the active or standby processing unit to differentiate between a peer processing unit failure and an interconnect failure, where diagnosing is always performed at the active peer processing unit prior to being performed at the standby peer processing unit if the active peer processing unit is still operational; and
   treating the peer processing unit subsequent to diagnosing a cause of detected loss of signaling, where treating is always performed by the active peer processing unit prior to being performed by the standby peer processing unit if the active peer processing unit is still operational to prevent the standby peer processing unit from assuming an active role while the active peer processing unit continues to provide service.

2. The method of claim 1 where diagnosing comprises:
sending interconnect keepalive messages to the peer processing unit on the interconnect at predetermined time intervals, where interconnect keepalive messages are sent at the process level;
sending acknowledgement (ACK) messages to the peer processing unit when interconnect keepalive messages sent from the peer processing unit are received, where ACK messages are sent at the interrupt level;
receiving ACK messages sent from the peer processing unit when an interconnect keepalive message is received at the peer processing unit, where ACK messages are received at the interrupt level;
receiving interconnect keepalive messages sent from the peer processing unit, where interconnect keepalive messages are received at the interrupt level;
maintaining an interconnect keepalive count which is incremented when an interconnect keepalive message is sent and cleared when an interconnect keepalive message is received;
maintaining an ACK count which is incremented when an interconnect keepalive message is sent and cleared when an ACK message is received;
diagnosing either an interconnect failure, the peer processing unit hung at interrupt level, or the peer processing unit being down if an ACK count threshold value is exceeded; and
diagnosing a hang of the peer processing unit at the process level if an interconnect keepalive count threshold value is exceeded and the ACK count threshold value is not exceeded.

3. The method of claim 2 further comprising:
setting the ACK count threshold value and interconnect keepalive count threshold value to be greater on the standby peer processing unit than on the active peer processing unit.

4. The method of claim 2 with treating comprising:
resetting the peer processing unit using a power cycler to cause a hard reset of the peer processing unit for all causes of failure;
repeating hard resetting of the peer processing unit a selected number of times if signaling from the peer processing unit is not re-established;
starting a timer when a peer processor rejoins successfully after hard reset of the peer processing unit occurs;
repeating hard resetting of the peer processing unit a selected number of times if the peer processing unit fails within the specified time interval; and
powering off the peer processing after the hard reset has been performed the selected number of times.

5. The method of claim 4 with hard resetting comprising:
sending an "off" command to a power cycling switch when hard resetting the peer processing unit, with the power cycling switch supporting "on" and "off" commands to control power for the peer processing unit and where the power cycling switch defaults to and "on" condition when first enabled and defaults to the "on" position when control is lost; and
sending an "on" command to the power cycling switch when a fixed delay from the sending of the "off" command has expired to power cycle the peer processing unit to restore power to the peer processing unit.

6. The method of claim 2 further comprising:
sending and receiving backchannel keepalive messages at predetermined time intervals over a backchannel, with the backchannel being a communication link between the active and standby peer processing units independent of the interconnect.

7. The method of claim 6 further comprising:
maintaining a backchannel count that is incremented when a backchannel keepalive message is sent and cleared when a backchannel keepalive message is received, with backchannel keepalive messages sent and received at interrupt level;
diagnosing that the backchannel has failed if a backchannel count threshold value is exceeded and signals are being received from the peer processing unit on the interconnect;
diagnosing that the backchannel has failed and the peer processing unit has not failed if the backchannel count threshold value is exceeded but interconnect keepalive messages and ACK messages are still being received;
diagnosing that the interconnect has failed and the peer processing unit has not failed if backchannel keepalive messages are received and interconnect keepalive messages and ACK messages are not received; and
diagnosing that any of the following: interconnect failure, the peer processing unit is hung at interrupt level, or the peer processing unit has failed if the backchannel count threshold value is exceeded and no signaling is received on the interconnect.

8. The method of claim 7 further comprising: setting the backchannel count threshold value to be greater on the standby peer processing unit than on the active peer processing unit.

9. The method of claim 6 with treating comprising:
sending a soft reset message to the peer processing unit over the backchannel to cause a soft reset of the peer processing unit if a software problem has caused the peer processing unit to hang at process level;
resetting the peer processing unit using a power cycler to cause a hard reset of the peer processing unit for causes other than the peer processing unit hung at process level;
starting a timer when soft or hard reset of the peer processing unit occurs;
hard resetting the peer processor if a reset timeout value expires and signaling from the peer processing unit is not re-established;
repeating hard resetting of the peer processing unit a selected number of times if signaling from the peer processing unit is not re-established;
starting a timer when a peer processor rejoins successfully after soft or hard reset of the peer processing unit occurs;
repeating hard resetting of the peer processing unit a selected number of times if the peer processing unit fails within the specified time interval; and
powering off the peer processing after the hard reset has been performed the selected number of times.

10. The method of claim 9 with hard resetting comprising: sending an "off" command to a power cycling switch when hard resetting the peer processing unit, with the power cycling switch supporting "on" and "off" commands to control power for the peer processing unit and where the power cycling switch defaults to and "on" condition when first enabled and defaults to the "on" position when control is lost; and sending an "on" command to the power cycling switch when a fixed delay from the sending of the "off" command has expired to power cycle the peer processing unit to restore power to the peer processing unit.

11. An apparatus comprising:
means for detecting loss of signaling between active and standby peer processing units in a high-availability system, with the active and standby peer processing units connected by an interconnect over which interconnect keepalive signals are sent between active and standby peer processing units and over which interconnect acknowledge signals responsive to the interconnect keepalive signals are sent between the active and standby peer processing units and where the standby processing unit takes over functions of the active processing unit should the active processing unit fail;

means for diagnosing a cause of loss of signaling if loss of signaling is detected at either the active or standby processing unit to differentiate between a peer processing unit failure and an interconnect failure, where diagnosing is always performed at the active peer processing unit prior to being performed at the standby peer processing unit if the active peer processing unit is still operational; and means for treating the peer processing unit subsequent to diagnosing a cause of detected loss of signaling, where treating is always performed by the active peer processing unit prior to being performed by the standby peer processing unit if the active peer processing unit is still operational to prevent the standby peer processing unit from assuming an active role while the active peer processing unit continues to provide service.

12. The apparatus of claim 11 where means for diagnosing comprises:

means for sending interconnect keepalive messages to the peer processing unit on the interconnect at predetermined time intervals, where interconnect keepalive messages are sent at the process level;

means for sending acknowledgement (ACK) messages to the peer processing unit when interconnect keepalive messages sent from the peer processing unit are received, where ACK messages are sent at the interrupt level;

means for receiving ACK messages sent from the peer processing unit when an interconnect keepalive message is received at the peer processing unit, where ACK messages are received at the interrupt level;

means for receiving interconnect keepalive messages sent from the peer processing unit, where interconnect keepalive messages are received at the interrupt level;

means for maintaining an interconnect keepalive count which is incremented when an interconnect keepalive message is sent and cleared when an interconnect keepalive message is received;

means for maintaining an ACK count which is incremented when an interconnect keepalive message is sent and cleared when an ACK message is received;

means for diagnosing either an interconnect failure, the peer processing unit hung at interrupt level, or the peer processing unit being down if an ACK count threshold value is exceeded; and means for diagnosing a hang of the peer processing unit at the process level if an interconnect keepalive count threshold value is exceeded and the ACK count threshold value is not exceeded.

13. The apparatus of claim 12 further comprising:

means for setting the ACK count threshold value and interconnect keepalive count threshold value to be greater on the standby peer processing unit than on the active peer processing unit.

14. The apparatus of claim 12 with means for treating comprising:

means for resetting the peer processing unit using a power cycler to cause a hard reset of the peer processing unit for all causes of failure;

means for repeating hard resetting of the peer processing unit a selected number of times if signaling from the peer processing unit is not re-established;

means for starting a timer when a peer processor rejoins successfully after hard reset of the peer processing unit occurs;

means for repeating hard resetting of the peer processing unit a selected number of times if the peer processing unit fails within the specified time interval; and means for powering off the peer processing after the hard reset has been performed the selected number of times.

15. The apparatus of claim 14 with means for hard resetting comprising:

means for sending an "off" command to a power cycling switch when hard resetting the peer processing unit, with the power cycling switch supporting "on" and "off" commands to control power for the peer processing unit and where the power cycling switch defaults to and "on" condition when first enabled and defaults to the "on" position when control is lost; and means for sending an "on" command to the power cycling switch when a fixed delay from the sending of the "off" command has expired to power cycle the peer processing unit to restore power to the peer processing unit.

16. The apparatus of claim 12 further comprising:

means for sending and receiving backchannel keepalive messages at predetermined time intervals over a backchannel, with the backchannel being a communication link between the active and standby peer processing units independent of the interconnect.

17. The apparatus of claim 16 further comprising:

means for maintaining a backchannel count that is incremented when a backchannel keepalive message is sent and cleared when a backchannel keepalive message is received, with backchannel keepalive messages sent and received at interrupt level;

means for diagnosing that the backchannel has failed if a backchannel count threshold value is exceeded and signals are being received from the peer processing unit on the interconnect;

means for diagnosing that the backchannel has failed and the peer processing unit has not failed if the backchannel count threshold value is exceeded but interconnect keepalive messages and ACK messages are still being received;

means for diagnosing that the interconnect has failed and the peer processing unit has not failed if backchannel keepalive messages are received and interconnect keepalive messages and ACK messages are not received; and means for diagnosing that any of the following: interconnect failure, the peer processing unit is hung at interrupt level, or the peer processing unit has failed if the backchannel count threshold value is exceeded and no signaling is received on the interconnect.

18. The apparatus of claim 17 further comprising: means for setting the backchannel count threshold value to be greater on the standby peer processing unit than on the active peer processing unit.

19. The apparatus of claim 16 with means for treating comprising:

means for sending a soft reset message to the peer processing unit over the backchannel to cause a soft reset of the peer processing unit if a software problem has caused the peer processing unit to hang at process level;

means for resetting the peer processing unit using a power cycler to cause a hard reset of the peer processing unit for causes other than the peer processing unit hung at process level;

means for starting a timer when soft or hard reset of the peer processing unit occurs;

means for hard resetting the peer processor if a reset timeout value expires and signaling from the peer processing unit is not re-established;

means for repeating hard resetting of the peer processing unit a selected number of times if signaling from the peer processing unit is not re-established;

means for starting a timer when a peer processor rejoins successfully after soft or hard reset of the peer processing unit occurs;

means for repeating hard resetting of the peer processing unit a selected number of times if the peer processing unit fails within the specified time interval; and means for powering off the peer processing after the hard reset has been performed the selected number of times.

20. The apparatus of claim 19 with means for hard resetting comprising:

means for sending an "off" command to a power cycling switch when hard resetting the peer processing unit, with the power cycling switch supporting "on" and "off" commands to control power for the peer processing unit and where the power cycling switch defaults to and "on" condition when first enabled and defaults to the "on" position when control is lost; and means for sending an "on" command to the power cycling switch when a fixed delay from the sending of the "off" command has expired to power cycle the peer processing unit to restore power to the peer processing unit.

21. An apparatus comprising:

active and standby peer processing units where the standby processing unit takes over functions of the active processing unit should the active processing unit fail;

an interconnect coupling the active and standby peer processing units over which interconnect keepalive signals are sent between the active and standby peer processing units and over which interconnect acknowledge signals responsive to the interconnect keepalive signals are sent between the active and standby peer processing units;

with each of the active and standby peer processing units configured to:

detect loss of signaling between active and standby peer processing units;

diagnose a cause of loss of signaling if loss of signaling is detected at either the active or standby processing unit to differentiate between a peer processing unit failure and an interconnect failure, where diagnosing is always performed at the active peer processing unit prior to being performed at the standby peer processing unit if the active peer processing unit is still operational, and treat the peer processing unit subsequent to diagnosing a cause of detected loss of signaling, where treating is always performed by the active peer processing unit prior to being performed by the standby peer processing unit if the active peer processing unit is still operational to prevent the standby peer processing unit from assuming an active role while the active peer processing unit continues to provide service.

22. The apparatus of claim 21 where the active and standby peer processing units are further configured to:

send interconnect keepalive messages to the peer processing unit on the interconnect at predetermined time intervals, where interconnect keepalive messages are sent at the process level;

send acknowledgement (ACK) messages to the peer processing unit when interconnect keepalive messages sent from the peer processing unit are received, where ACK messages are sent at the interrupt level;

receive ACK messages sent from the peer processing unit when an interconnect keepalive message is received at the peer processing unit, where ACK messages are received at the interrupt level;

receive interconnect keepalive messages sent from the peer processing unit, where interconnect keepalive messages are received at the interrupt level;

maintain an interconnect keepalive count which is incremented when an interconnect keepalive message is sent and cleared when an interconnect keepalive message is received;

maintain an ACK count which is incremented when an interconnect keepalive message is sent and cleared when an ACK message is received;

diagnose either an interconnect failure, the peer processing unit hung at interrupt level, or the peer processing unit being down if an ACK count threshold value is exceeded; and diagnose a hang of the peer processing unit at the process level if an interconnect keepalive count threshold value is exceeded and the ACK count threshold value is not exceeded.

23. The apparatus of claim 22 where the active and standby peer processing units are further configured to:

set the ACK count threshold value and interconnect keepalive count threshold value to be greater on the standby peer processing unit than on the active peer processing unit.

24. The apparatus of claim 22 where the active and standby peer processing units are further configured to:

reset the peer processing unit using a power cycler to cause a hard reset of the peer processing unit for all causes of failure;

repeat hard resetting of the peer processing unit a selected number of times if signaling from the peer processing unit is not re-established;

start a timer when a peer processor rejoins successfully after hard reset of the peer processing unit occurs;

repeat hard resetting of the peer processing unit a selected number of times if the peer processing unit fails within the specified time interval; and power off the peer processing after the hard reset has been performed the selected number of times.

25. The apparatus of claim 24 further comprising:

a first power cycler switch coupled to the active peer processing unit to control power for the active peer processing unit and having a control input coupled to the standby peer processing unit to receive commands from the standby peer processing unit;

a second power cycler switch coupled to the standby peer processing unit to control power for the standby peer processing unit and having a control input coupled to the active peer processing unit to receive commands from the active peer processing unit, with first and second power cycling switches supporting "on" and "off" commands to control power for the peer processing unit and where the first and second power cycling switches default to and "on" condition when first enabled and default to the "on" position when control is lost;

where the active and standby peer processing units are further configured to:

send an "off" command to a power cycling switch when hard resetting the peer processing unit; and send an "on" command to the power cycling switch when a fixed delay from the sending of the "off" command has expired to power cycle the peer processing unit to restore power to the peer processing unit.

26. The apparatus of claim 22 further comprising:

a backchannel, with the backchannel being a communication link between the active and standby peer processing units independent of the interconnect;

where the active and standby peer processing units are further configured to:

send and receiving backchannel keepalive messages at predetermined time intervals over a backchannel.

27. The apparatus of claim 26 where the active and standby peer processing units are further configured to:

maintain a backchannel count that is incremented when a backchannel keepalive message is sent and cleared when a backchannel keepalive message is received, with backchannel keepalive messages sent and received at interrupt level;

diagnose that the backchannel has failed if a backchannel count threshold value is exceeded and signals are being received from the peer processing unit on the interconnect;

diagnose that the backchannel has failed and the peer processing unit has not failed if the backchannel count threshold value is exceeded but interconnect keepalive messages and ACK messages are still being received;

diagnose that the interconnect has failed and the peer processing unit has not failed if backchannel keepalive messages are received and interconnect keepalive messages and ACK messages are not received; and diagnose that any of the following: interconnect failure, the peer processing unit is hung at interrupt level, or the peer processing unit has failed if the backchannel count threshold value is exceeded and no signaling is received on the interconnect.

28. The apparatus of claim 27 where the active and standby peer processing units are further configured to:

set the backchannel count threshold value to be greater on the standby peer processing unit than on the active peer processing unit.

29. The apparatus of claim 26 where the active and standby peer processing units are further configured to:

send a soft reset message to the peer processing unit over the backchannel to cause a soft reset of the peer processing unit if a software problem has caused the peer processing unit to hang at process level;

reset the peer processing unit using a power cycler to cause a hard reset of the peer processing unit for causes other than the peer processing unit hung at process level;

start a timer when soft or hard reset of the peer processing unit occurs;

hard reset the peer processor if a reset timeout value expires and signaling from the peer processing unit is not re-established;

repeat hard resetting of the peer processing unit a selected number of times if signaling from the peer processing unit is not re-established;

start a timer when a peer processor rejoins successfully after soft or hard reset of the peer processing unit occurs;

repeat hard resetting of the peer processing unit a selected number of times if the peer processing unit fails within the specified time interval; and power off the peer processing after the hard reset has been performed the selected number of times.

30. The apparatus of claim 29 further comprising:

a first power cycler switch coupled to the active peer processing unit to control power to the standby peer processing unit and having a control input coupled to the standby peer processing unit to receive commands from the active peer processing unit;

a second power cycler switch coupled to the standby peer processing unit to control power to the active peer processing unit and having a control input coupled to the active peer processing unit to receive commands from the standby peer processing unit, with first and second power cycling switches supporting "on" and "off" commands to control power for the peer processing unit and where the first and second power cycling switches default to and "on" condition when first enabled and default to the "on" position when control is lost;

where the active and standby peer processing units are further configured to:

send an "off" command to a power cycling switch when hard resetting the peer processing unit; and send an "on" command to the power cycling switch when a fixed delay from the sending of the "off" command has expired to power cycle the peer processing unit to restore power to the peer processing unit.

\* \* \* \* \*